April 9, 1957  J. M. NAUL  2,788,458
HIGH STARTING TORQUE INDUCTION MOTOR ROTOR
Filed Dec. 9, 1953

% ROTOR VOLTS – SLIP & FREQUENCY

INVENTOR.
James M. Naul
BY
James and Franklin
Attorneys

United States Patent Office 2,788,458
Patented Apr. 9, 1957

2,788,458
HIGH STARTING TORQUE INDUCTION MOTOR ROTOR

James M. Naul, Plainfield, N. J., assignor to Eastern Air Devices, Inc., Brooklyn, N. Y., a corporation of New York Application December 9, 1953, Serial No. 397,134

4 Claims. (Cl. 310—212)

The present invention relates to the structure of an induction motor rotor specifically designed to increase the starting torque of the motor without adversely affecting the normal running characteristics thereof.

The simplicity and sturdiness of the induction motor has made it a favored piece of equipment. Its characteristics when running at rated speed or close thereto are excellent. However, its starting torque, and particularly its starting torque per ampere, are often not as great as might be desired, and any improvement in those characteristics is greatly sought after.

At the time of starting, when the rotor is stationary, the resultant stator-generated flux rotates with respect to the rotor, thus inducing in the conductors which form a part of the rotor a current which will alternate at a frequency determined by the frequency of alternation of the stator-induced flux. When the rotor is turning almost in synchronism with the stator-induced flux, there is little relative motion or slip between the flux and the conductors in the rotor, and consequently the frequency of alternation of the current in said conductors approaches zero. The normal operating characteristics of a motor of this type depend upon a number of factors, primary among which is the effective resistance of the rotor conductors, the smaller that resistance the more satisfactory the normal running operation of the motor. Yet to produce a high starting torque, it is desirable that the effective resistance of the rotor conductors be increased to a point well above that which is best for normal running. Thus it has long been accepted that a rotor which will exhibit a high starting torque will not operate in an optimum manner when rotating at rated speed, and vice versa.

It has been proposed in the past to utilize the differences in the frequencies of the currents induced in the rotor conductors when starting and when at rated speed respectively in order to give rise to a change in the resistive characteristics of the rotor conductors, so that when the rotor current is at high frequency (starting condition) the current will traverse a conductor of high resistance, thus imparting an increased torque for starting, and when the rotor current frequency is low (running condition), the rotor currents will traverse a conductor having a low resistance, thus imparting proper running characteristics. This has been accomplished by using a so-called double squirrel cage. Each of the rotor conductors is formed in two sections, one close to the periphery of the rotor and having a small cross section and the other deeper within the rotor and having a larger cross section. The outer section, because it is close to the periphery of the rotor, will have a low reactance, and because it is of small cross section it will have a high resistance, while the inner section, because it is deep within the rotor, will have a high reactance, and because it has a large cross section it will have a small resistance. These two conductor sections are radially disposed relative to one another with respect to rotor, and their ends are conductively connected. At starting the rotor current, which has a high frequency and the passage of which will consequently be opposed by the conductor section having a high reactance, will pass predominantly through the outer conductor section, which has a high resistance. As the rotor comes up to speed the frequency of the rotor current will decrease, the inner conductor section will offer less reactance thereto, and consequently more and more of the rotor current will pass through that conductor section having the lower resistivity.

This mode of construction does impart a higher starting torque to the motor than would otherwise be the case. However its normal running characteristics are adversely affected. When the motor is running at rated speed, torque is produced primarily by the current which traverses a conductor located fairly deeply within the rotor. Hence not all of the flux generated by the stator will act upon that conductor section. The effect of this inner conductor section in producing a high starting torque will increase as the reactance of that section increases, that is to say, as it is positioned more deeply within the rotor and as it is more completely ringed by magnetizable material. However, the deeper this conductor section is positioned within the rotor, the smaller proportion of the stator-generated flux will link with it, and the more completely this inner rotor conductor section is ringed by magnetic material, the greater proportion of the stator-generated flux will bypass it. Thus the double squirrel cage design necessarily represents a compromise in any given case, high starting torque being achieved only at the sacrifice of normal running characteristics and to the extent that those characteristics are sacrificed.

The double squirrel cage construction is subject to another significant disadvantage. At starting, when the rotor currents are at their largest value and are traversing conductor sections of high resistance, considerable heat is generated in the rotor. The sections of the rotor within which this appreciable amount of heat is developed are located under and in close proximity to the stator poles, so that it is difficult to dissipate the heat thus produced. The consequent tendency of the rotor to overheat represents an important factor, particularly when it takes an appreciable time for the motor to come up to speed. Not only does the rotor tend to heat up excessively because its heat-producing portions are confined, but that heat which is dissipated by the rotor tends to heat the closely adjacent stator poles and the windings which surround those poles.

The rotor structure of the present invention avoids the above mentioned disadvantages. The primary conductive parts of low resistance designed to function during normal running of the motor are positioned close to the periphery of the rotor, and may take whatever design is most desirable with respect to the normal running characteristics of the motor. The rotor conductive parts from which the starting torque is derived are attached to an end of the rotor, and preferably to one side of the stator poles. Two independent conductive parts are there provided, one of high reactance and preferably low resistance and the other of low reactance and high resistance. Both of these parts are connected at one end to one another and to the primary rotor conductive parts of low resistance, the other ends of these two rotor conductive parts being conductively connected. As here disclosed, two sets of starting-torque-producing parts are provided, one at each end of the rotor.

The network defined by each set of these two conductive parts is frequency-sensitive, since one of the sections is of high reactance and the other is of low reactance. When the rotor current is at high frequency (starting), passage of the current through the high reactance part will be minimal, most of the current will pass through the low reactance part, that part has a high resistance, and consequently a high starting torque will be produced. When the rotor current is at a low frequency (running), the high reactance part will not offer appreciable resistance to the passage of current and, because its resistance is lower than that of the low reactance section, the bulk of the current will pass therethrough.

Since the frequency sensitive network, including the high resistance part, is located at an end of the primary rotor section, it may be tailored to any desired electrical characteristic independently of and without affecting in any way the design of the primary rotor section. Thus the primary rotor section may be so constructed as to provide optimum normal running characteristics entirely independently of the frequency-sensitive network which imparts the starting characteristics, and conversely the latter network may be designed entirely independently of and without affecting that portion of the rotor which determines the normal running characteristics of the motor. Hence no compromise is necessary, either as to normal running characteristics or as to starting characteristics.

There are other advantages inherent in this location of the frequency-sensitive network. In the first place, the high resistance conductive parts in which the greatest amount of heat is produced are exposed, and hence that heat is readily dissipated. Moreover, the heat is dissipated in such a manner as to heat the stator and the stator coils only to a minimal degree. Secondly, this mode of construction permits existing rotors to be readily modified to carry out the teachings of the instant invention merely by adding to the length thereof and without requiring any change whatsoever in the stators. Thirdly, when, as is here specifically disclosed, the conductive parts of high resistance are positioned between the primary rotor section and an extreme rotor section formed primarily of magnetic material, a uniform and efficient current distribution at high power factor is produced in the rotor conductors, thus leading to improved operating characteristics, and particularly an improved torque characteristic, both at starting and during normal running.

To the accomplishment of the above, and to such other objects as may hereinafter appear, the present invention relates to the construction of an induction motor rotor as defined in the appended claims and as described in this specification, taken together with the accompanying drawings in which:

Fig. 2 is a fragmentary cross sectional view thereof taken along the line 2—2 of Fig. 1;

Figure 1:
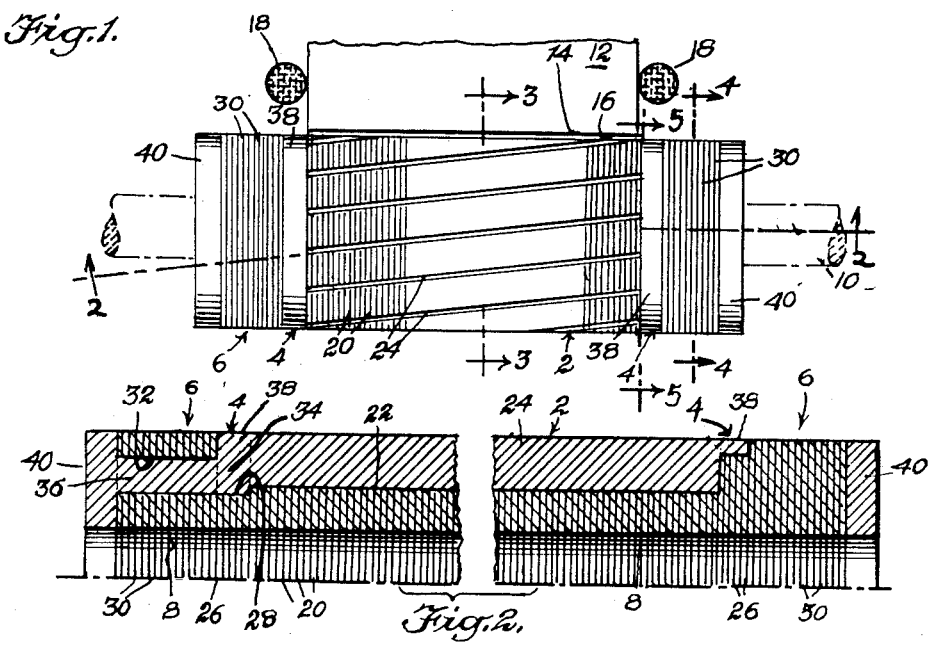
Fig. 1 is a front elevational view of a rotor of the present invention, that rotor being shown in its preferred relationship with respect to a stator pole.

The rotor, which may be built up from a plurality of stamped or punched laminations of readily magnetizable material, as is conventional, comprises a central primary section generally designated 2, intermediate sections generally designated 4 at either end of the central section 2, and extreme sections generally designated 6 outside and adjacent the intermediate sections 4. Each of these sections is centrally apertured at 8 so that a shaft 10 may pass therethrough, the sections being secured to one another and to the shaft 10 in any conventional manner for simultaneous rotation.

Figure 3:
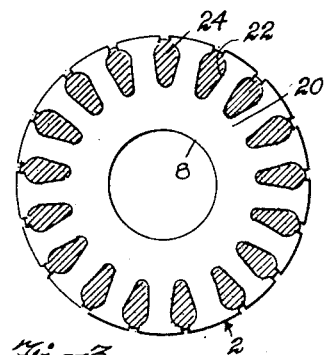
Fig. 3 is an end cross sectional view taken along the line 3—3 of Fig. 1.
Figure 4:
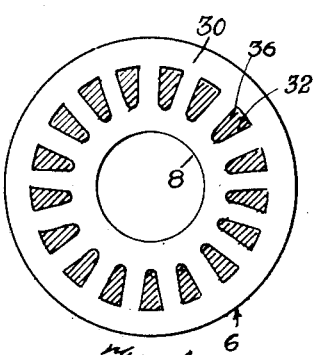
Fig. 4 is a similar view taken along the line 4—4 of Fig. 1.
Figure 5:
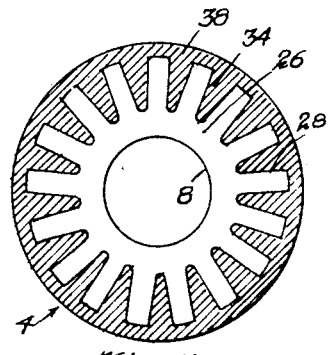
Fig. 5 is a similar view taken along the line 5—5 of Fig. 1.

The length of the central section 2 is preferably equal to the length of the stator poles 12 with which it is to be associated, those poles having faces 14 spaced from the periphery of the central rotor section 2 by a gap 16 and being surrounded by an energizing coil 18, as is conventional. The central rotor section 2 may be built up of a plurality of stamped laminations such as the lamination 20 of Fig. 3, those laminations being provided with slots 22 of appreciable cross-section close to, and here shown as having open mouths extending to, the periphery of the laminations 20. The laminations 20 are assembled so that slots 22 in one lamination are substantially in line with the corresponding slots 22 in the next lamination so as to define elongated slots extending the length of the center rotor section 2 but circumferentially spaced from one another. The thus defined elongated slots may be parallel to the longitudinal axis of the rotor section 2, but, as is conventional and as is here specifically disclosed, they may also be inclined somewhat with respect thereto. The laminations 20 are, of course, formed of some highly magnetic permeable material, such as steel.

It will be appreciated that the central rotor section 2 is in all respects substantially conventional, and when the elongated slots defined by the individual lamination slot 22 have a conductive material inserted thereinto, as by being filled with aluminum or the like 24, the conductive material 24 will define conductive parts which, because they are located close to the periphery of the rotor section 2, have a comparatively low reactance and, because they are of comparatively large cross section, have a comparatively low resistance. The particular shape and orientation of the conductor parts 24 may be varied in numerous ways, all as well understood to those skilled in the art, in order to produce whatever normal running characteristics may be desired.

The intermediate rotor sections 4 are shown as built up from individual laminations 26 of magnetically permeable material, the outer diameter of which is less than the outer diameter of the laminations 20, but this section could also be formed of some insulating material, laminated or unlaminated. The laminations 26 are provided with slots 28 of appreciable cross section which open at the periphery of the laminations 26. There are as many slots 28 in the laminations 26 as there are slots 22 in the laminations 20, and the laminations 26 are so oriented that their slots 28 line up with the slots 22 in the laminations 20 in the extreme ends of the central rotor section 2. The radially inner ends of the slots 28 preferably are radially inwardly disposed a greater distance than the corresponding ends of the slots 22.

The extreme rotor sections 6 are built up from a plurality of laminations 30 of readily magnetically permeable material, those laminations having slots 32 of appreciable cross section equal in number and angular disposition to the slots 22 and 28 respectively and located comparatively radially deep within the laminations 30 and completely ringed by magnetizable material. The external diameter of the laminations 30 is greater than the external diameter of the laminations 28, and may be the same as the external diameter of the laminations 20. The laminations 30 are arranged outside the laminations 26 which define the intermediate rotor sections 4, and with the slots 32 substantially in line with the corresponding slots 28 and 22.

When the rotor laminations 20, 26 and 30 are thus assembled, conductive material such as aluminum or the like, designated by the numerals 34 and 36, is inserted into the slots 28 and 32 respectively, and is also inserted around the periphery of the laminations 26 and between the outwardly radially extending portions of the laminations 20 and 30 on either side thereof, this latter conductive material being designated by the numeral 38. This is preferably done at the same time that the conductive material 24 is inserted into the slots 22, and is usually accomplished by pouring molten conductive material into the slots which extend longitudinally through the rotor and permitting that material to harden in place.

At the same time, conductive rings 40 of appreciable cross section are formed on the ends of the extreme rotor sections 6 so as to conductively connect the ends of the conductive material 36.

Figure 6:
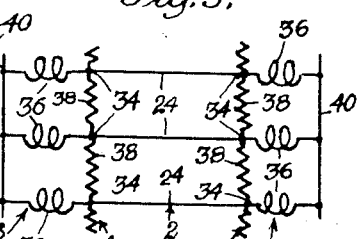
Fig. 6 is a schematic view illustrating the circuit arrangement of the rotor conductors.

By means of this construction a conductive network is formed in the rotor which is schematically represented in Fig. 6. The conductor parts 24 formed in the central rotor section 2 have low reactance and low resistance, and consequently are designated by straight lines. The conductive parts 36 formed in the extreme rotor sections 6 have low resistance and high reactance, and consequently are represented by the conventional symbols for an inductance. The conductive parts 34 in the slots 28 function merely as electrical bridges or connectors which do not add appreciably either to the inductance or the resistance of the overall circuit. Because the external diameter of the laminations 26 is only slightly less than the external diameter of the laminations 20 and 30, the cross sectional area of the conductive parts 38 is small, those parts therefore having an appreciable resistance and being indicated in Fig. 6 by the conventional symbols for a resistor. Since the parts 38 extend completely around the periphery of the rotor, they connect each of the conductive parts 24 in advance of the high reactance conductive parts 36. The end rings 40 connect the outer ends of the high reactance conductive parts 36 without appreciably adding to the resistance of the overall circuit.

A simplified explanation of the interaction of the thus defined network follows. When the motor is to start, the flux generated in the stator poles 12 by the alternating current passing through the energizing coils 18 will induce a current in the conductive parts 24 and because the rotor is stationary that current will have a high frequency. Since the conductive parts 36 have an appreciable reactance, the high frequency current induced in the conductor 24 will not pass therethrough but will instead pass through the conductive parts 38 of high resistance. Because of the high resistance, an appreciable starting torque will be developed. The magnitude of that torque will be largely determined by the resistance value of the conductive parts 38. This is in turn controlled by the cross sectional area of those conductive parts 38, that area in turn being determined by the difference between the external diameter of the laminations 26 on the one hand and the laminations 20 and 30 on the other hand, and by the axial length of the intermediate sections 4, as determined by the use of a predetermined number of laminations 26. Moreover, after the conductive material 28 has been cast in place, the resistive value of the conductor parts 38 may be further modified with controllable precision where necessary by turning down the external diameter of the conductor sections 28 on a lathe to any desired degree. It should also be noted that the inductance of the conductive parts 36 will be determined by the depth to which they are positioned within the extreme rotor sections 6, and by the axial length of the extreme sections 6, as determined by the use of a predetermined number of laminations 26. Hence, through initial design of the laminations 30 and choice of the proper number of such laminations to be used, any desired inductive characteristic can be achieved, and after the rotor has been assembled, the inductance of the conductive parts 36 may be controllably modified where necessary by turning down the external diameter of the laminations 30 to any desired degree.

As the motor comes up to speed the frequency of the current induced in the conductor parts 24 will decrease, and consequently a greater and greater proportion of that current will pass through the conductive parts 36 and 40, those parts having a low resistance because of their comparatively large cross sectional area. Hence as the motor comes up to speed the high resistive conductive parts 38 will play a smaller and smaller part in the operation of the rotor until, when the rotor is in synchronism, they will play no substantial part at all, practically all of the induced rotor current passing only through low resistance conductor parts. Hence the rotor will have its normal and desired operating characteristics when running at rated speed.

Figure 7:
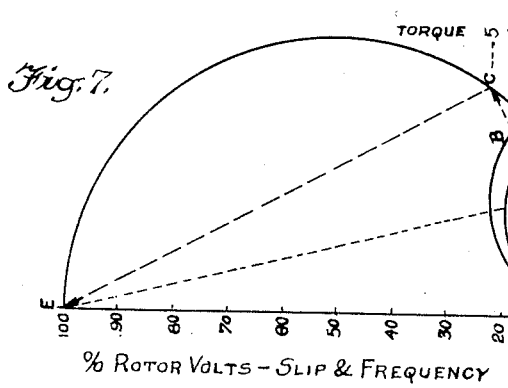
Fig. 7 is a graphical view illustrating the manner in which the rotor conductors cooperate at starting.

Fig. 7 is a graphical representation of the functioning of the network in question. When the rotor is stationary, a voltage OE will be induced in the conductor parts 24 and will be applied across the total circuit between the rings 40. Assuming for the moment that the resistive conductor parts 38 are not present, a current OA would result giving a torque having the arbitrary magnitude of 2. That current would produce a resistance voltage drop OD in phase with the current OA and determined by the resistance of the conductive sections 24, 34 and 36, and a reactive voltage drop DE having a 90-degree phase relationship to the voltage OA and impressed between the points 34. With the resistive conductive parts 38 in the circuit this voltage DE will cause an in-phase current AB to pass through the resistive conductive parts 38. (The non-concentric semi-circles OY and OX represent the locus of the extremities of the current vector AB for varying values of frequency.) Hence with the addition of the resistive conductive parts 38, a resultant current OB is produced in the rotor network which is only slightly larger in magnitude than the current OA resulting when the resistive conductor parts 38 are omitted, but which is so oriented with respect to the phase of the induced voltage that the torque, which is dependent upon the current component in phase with the voltage, is doubled. Thus the inclusion of the resistive conductor parts 38 gives rise to a 100% increase in starting torque, while the total current increase will be seen to be only 15%.

By way of contrast, a similar analysis of the operation of the double squirrel cage system shows a torque increase of only 75% under similar circumstances and with an overall current increase of 20%.

The construction of the present invention produces a much greater increase in starting torque than the double squirrel cage method for the same increase in rotor current, thus achieving its desired objective in a much more efficient manner, involving less heating of the rotor and less current consumption. However, that is only one advantage of the instant system. Another striking advantage is the fact that the frequency sensitive network defined by the conductive parts 34, 36 and 38, in which the increased starting torque is developed, may be designed and constructed entirely independently of the primary section 2 of the rotor which imparts to the rotor its normal running characteristics. Hence primary rotor sections 2 of any desired rating may be devised, the laminations 20 and the shape and location of the slots 22 formed therein being so shaped and located as to give the optimum induction motor performance at rated speed without any reference whatsoever to the attainment of high starting torque and without requiring any compromise with desired normal operating characteristics. The variables required for high starting torque and for good overall performance are concentrated in the intermediate and end rotor sections 4 and 6. The air gap 16 between the stator pole face 14 and the central rotor section 2 may be proportioned for best performance, does not affect the production of high starting torque, and does not in any way modify the functioning of the frequency-sensitive network which produces the starting torque.

Moreover, the frequency-sensitive network and the electrical characteristics thereof may readily and reliably be provided through advance design of the laminations 26 and 30 which make up the intermediate and extreme rotor sections 4 and 6 respectively, and through selection of the desired number of such laminations to produce rotor sections 4 and 6 of proper axial length. Indeed, already existing rotors may readily be modified in order to operate according to the present invention merely by adding an appropriate length of properly designed intermediate and extreme sections 4 and 6 thereto, and without requiring any modification of the remainder of the motor structure.

It may further be noted that the value of the resistive conductor parts 38 is independent of the core stack of the rotor. Any commercial line of motors usually has ratings with several different lengths of core stacks. In the double squirrel cage construction the core stack length controls the value of the resistive conductor section which gives starting torque. Thus with the double squirrel cage construction every change in length of the core stack would require a corresponding change in the cross section of the resisitive conductor section if the same operating characteristics were to be achieved. With the instant invention, however, the core stack may be made of any length and utilizing the same lamination punchings, the resistive value of the conductor parts 38 being determined independently of the primary core stack length. In some cases it might be necessary, in order to accommodate for different core stack lengths, to utilize laminations 26 of non-standard design for the intermediate rotor sections 4, but in most cases variations in primary core stack lengths can be compensated for without changing any laminations by using an appropriate number of standard laminations 26.

In addition, the high resistance part of the circuit—the conductor parts 38—is on the outside periphery of the rotor and is outside of the gap 14 between the rotor and the stator poles 12. Consequently the heat generated therein is very readily radiated without heating up the entire rotor, and is so radiated as to increase the temperature of the stator only to a minimal degree. In addition, because the frequency-sensitive circuit defines a polar reactance defined by the magnetic core section 30, a more uniform current distribution will result in the rotor, thus leading to higher torque per ampere.

While the specific disclosure here made shows two sets of intermediate and extreme rotor sections 4 and 6, one at each end of the primary rotor section 2, thus making the section 2 a central section, it is entirely feasible to concentrate the frequency-sensitive network at one end of the rotor only. This would be indicated when a centrifugal cut-out is used on a single phase motor, for example.

From the foregoing it would be apparent that, although but a single embodiment of the present invention has been here specifically disclosed, many variations may be made therein without departing from the spirit of the invention as defined in the following claims. Indeed, one of the prime advantages of the instant invention is the facility with which such specific variations may be made therein so as to adapt the invention for use with rotors of varying designs and characteristics, and so as to produce desired starting and overall operating characteristics over an extremely wide range.

I claim:

1. An induction motor rotor comprising a continuous stack of laminations of three types, the first type having slots extending radially substantially to the periphery of the laminations, the second type comprising radial arms separated by slots, the third type having slots radially outwardly terminating short of the periphery of said laminations and thus being substantially completely ringed by magnetic material, the laminations at least of said first and third types being of magnetizable material, said laminations being grouped axially of said rotor according to type, one or more laminations of the second type being interposed directly between groups of laminations of the first and third types respectively, the slots in each of said lamination types lining up with one another, electrically conductive material in said slots and circumferentially covering the lamination or laminations of said second type, said conductive material defining a plurality of generally longitudinally extending conductors connected intermediate their length by a conductive ring on the exterior of said rotor, and electrically conductive material connecting the axial ends of said longitudinal extending conductors.

2. An induction motor rotor comprising a continuous stack of laminations of three types, the first type having slots extending radially substantially to the periphery of the laminations, the second type comprising radial arms separated by slots, said arms terminating radially short of the periphery of said first type, the third type having slots radially outwardly terminating short of the periphery of said laminations and thus being substantially completely ringed by magnetic material, the laminations at least of said first and third types being of magnetizable material, the laminations of said first and third types having substantially the same peripheral size, said laminations being grouped axially of said rotor according to type, one or more laminations of the second type being interposed directly between groups of laminations of the first and third types respectively, the slots in each of said lamination types lining up with one another, electrical conductive material in said slots and circumferentially covering the lamination or laminations of said second type between the radial outer portions of said first and third lamination types, said conductive material defining a plurality of generally longitudinally extending conductors connected intermediate their length by a conductive ring on the exterior of said rotor, and electrically conductive material connecting the axial ends of said longitudinally extending conductors.

3. The rotor of claim 2, in which the outer surface of the conductive material covering the lamination or laminations of said second type is substantially coincident with the outer surfaces of the laminations of said first and third types.

4. The rotor of claim 2, in which the outer surface of the conductive material covering the lamination or laminations of said second type is no higher than the outer surfaces of the laminations of said first and third types.

References Cited in the file of this patent

UNITED STATES PATENTS

| | | |
|---|---|---|
| 936,292 | Bergman | Oct. 12, 1909 |
| 1,079,332 | Fynn | Nov. 25, 1913 |
| 1,437,886 | Bruncken | Dec. 5, 1922 |
| 1,743,818 | Hansen et al. | Jan. 14, 1930 |
| 1,772,719 | Johnson | Aug. 12, 1930 |
| 2,196,059 | Cox | Apr. 2, 1940 |
| 2,242,006 | Leader | May 13, 1941 |
| 2,648,788 | Fleischer | Aug. 11, 1953 |

FOREIGN PATENTS

| | | |
|---|---|---|
| 698,226 | France | Nov. 17, 1930 |
| 740,689 | Germany | Oct. 27, 1943 |